Feb. 2, 1965  H. R. ALLEY ETAL  3,167,827
VINYL WEATHERSTRIP
Original Filed March 25, 1960

INVENTORS
Harry R. Alley,
BY James H. Wernig &
Lyle N. Williams
Herbert Furman
ATTORNEY

United States Patent Office 3,167,827
Patented Feb. 2, 1965

3,167,827
VINYL WEATHERSTRIP
Harry R. Alley, Anderson, Ind., James H. Wernig, Birmingham, Mich., and Lyle N. Williams, Anderson, Ind., assignors to General Motors Corporation, Detroit, Mich., a corporation of Delaware
Continuation of application Ser. No. 17,639, Mar. 25, 1960. This application Jan. 24, 1963, Ser. No. 254,047
4 Claims. (Cl. 20—69)

This invention relates to sealing strips and more particularly to flexible elongate sealing strips for sealing closures. This application is a continuation of applicants' copending application Serial No. 17,639, filed March 25, 1960, and now abandoned.

One of the main features of this invention is that it provides a sealing strip which includes a resilient elongate body of polyvinyl resin foam material having an outer coextensive layer of substantially non-porous or solid polyvinyl resin which is formed integrally with the body so as to encase the body entirely within the outer layer.

Another feature of this invention is that it provides a resilient elongate sealing strip which includes integral attaching means for mounting the sealing strip on a supporting member. In carrying out this feature of the invention, the base section of the sealing strip includes a substantially thick base layer of the solid polyvinyl resin and a number of headed buttons of solid polyvinyl resin project from the base layer. Lateral access passages open from the side of the sealing strip to bores within the buttons so that a suitable tool can be inserted to stretch the heads of the buttons whereby they can be inserted through openings of smaller diameter in the supporting member. The openings in the supporting member are spaced apart a greater distance than the spacing between the attaching buttons so that the sealing strip is stretched between its points of attachment on the supporting member so as to grip the supporting member intermediate its points of attachment thereto.

A further feature of this invention is that it provides a sealing strip having a body of polyvinyl resin foam material which includes a base section and a sealing lip projecting angularly outwardly therefrom, with the base section and the sealing lip being encased within an outer layer of substantially non-porous or solid polyvinyl resin which is formed integrally therewith. Opposite to the sealing lip and projecting oppositely thereto, is a rigidifying rib of solid polyvinyl resin which rigidifies the base section against rolling on the supporting member to ensure that the sealing lip will flex independently of the base section when the lip engages a sealing surface. The substantially thick base layer of solid polyvinyl resin on the base section cooperates with the rigidifying rib in rigidifying the base section against rolling on the supporting member to further ensure independent flexing of the sealing lip.

These and other features of this invention will be readily apparent from the following specification and drawing wherein.

Figure 1:
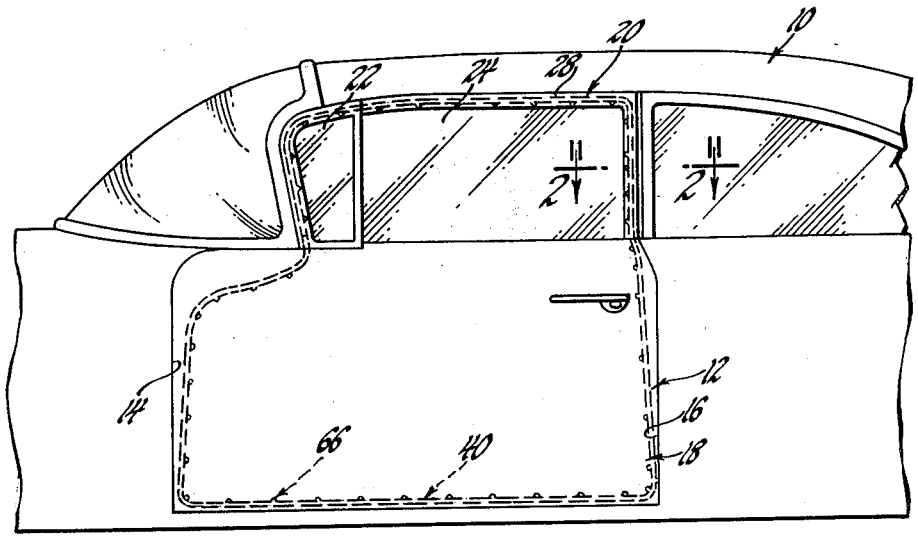
FIGURE 1 is a partial side elevational view of a vehicle body having a door mounted thereon for movement between open and closed positions, with the door mounting a sealing strip according to this invention so as to seal the door against the body in the closed position thereof.

Referring now particularly to FIGURE 1 of the drawing, a vehicle body 10 includes a front door 12 which is hinged to the body adjacent its forward edge 14 for swinging movement between a closed position, as shown, and an open position, not shown, with the door being latched to the body in closed position by suitable latching means mounted on the door adjacent the rearward edge 16 thereof. Door 12 includes a lower door section 18 and an upper door window frame section 20 which defines the door window opening for the swingable ventilation window 22 and the vertically movable door window 24.

Figure 2:
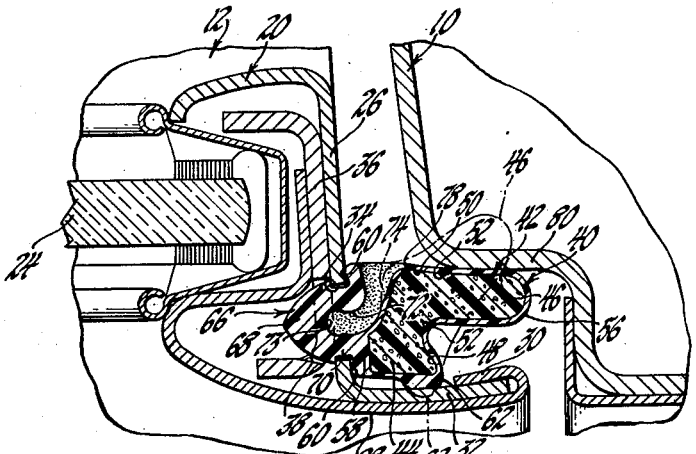
FIGURE 2 is an enlarged sectional view taken generally along the plane indicated by line 2—2 of FIGURE 1.

Referring now particularly to FIGURE 2 of the drawing, the door window frame section 20 includes an inner frame member 26 and an outer frame member 28 having a terminal flange 30 bent over a terminal flange 32 of member 26 to provide the door outer flange. Member 26 includes a number of spaced apertures 34, and a channel-shaped reinforcing member 36 which is secured to member 26 is also provided with a like number of complementary spaced apertures 38 larger than the apertures 34. It will be understood, of course, that the apertures 34 are provided entirely around the frame section 20 and that similar apertures are also provided in the front hinge pillar face, bottom face, and rear lock pillar face of the lower door section 18. As indicated schematically in FIGURE 1 of the drawing, the apertures 34 mount a sealing strip 40 according to this invention on the door 12 so as to seal the door against the body when the door is in a closed position as shown.

Figure 3:
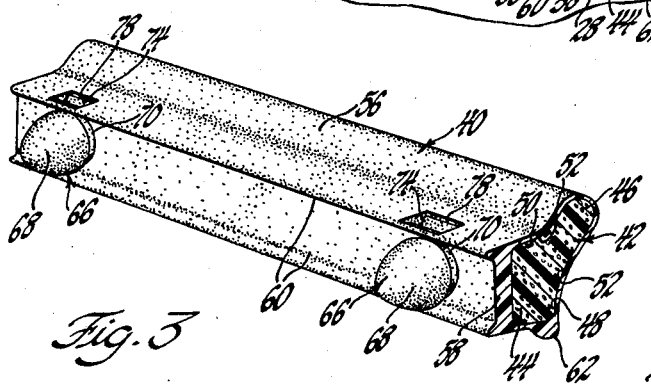
FIGURE 3 is a perspective view of a portion of the sealing strip.

The sealing strip 40 will now be described with particular reference to FIGURES 2 and 3 of the drawing. Strip 40 includes a resilient elongate body 42 of polyvinyl resin foam material. Body 42 generally includes a base section 44 and an integral angularly outwardly extending sealing lip 46 which projects from one of the upper corners of the base section and is joined to the upper wall 48 and side wall 50 of the base section by arcuate juncture portions 52 to increase the ability of the sealing lip to flex independently of the base section. The elongate body 42 is encased within an outer coextensive layer 56 of substantially non-porous or solid polyvinyl resin which is formed integrally with the body 42. As shown, the outer layer 56 is generally thin around the sealing lip 46 and the upper and side walls of the base section. However, the outer layer 56 includes a substantially thick base layer 58 on the lower wall of the base section 44, with the base layer including a pair of laterally extending ribs 60. A substantially thick rigidifying rib 62 formed integral with layer 56 is located at the other upper corner of the base section, generally opposite to the sealing lip 46, and projects oppositely thereto.

Projecting from the base layer 58 intermediate the ribs 60 are a plurality of spaced integral mounting buttons 66 which provide the means for mounting strip 40 on the door as will be further described. The mounting buttons 66 generally include an ogival or bullet shaped head 68 joined to layer 58 by a short inset neck 70. As shown in FIGURE 2 of the drawing, the neck 70 is provided with a rectangularly shaped passage 72 which terminates in a rectangularly shaped bulbous end 73 located partially within the neck 70 and partially within the head 68 of each of the buttons. The passage 72 joins to a lateral rectangularly shaped flared passage 74 which opens outwardly of wall 50 of the strip underneath the sealing lip 46. As can be seen in FIGURES 2 and 3, the upper and lower walls of the passage 74 merge arcuately with an enlarged outer generally rectangularly shaped opening 78 which is inset very slightly from the outer side face of the strip. Layer 56 covers passage 74 and joins to the base layer 58 to ensure that body 42 is entirely encased within solid or substantially non-porous polyvinyl resin.

When it is desired to mount the strip 40 on the door, a suitable tool is inserted through the passages 72 and 74 into the bulbous end 73 of the button. The button is then stretched with respect to the base layer 58 so that the head 68 of the button can be inserted through an aperture 34 in the door, the diameter of aperture 34 being less than the diameter of the base of the head 68 of the button, as shown. Thereafter, the tool is removed and the lower wall of the head 68 will grasp the inner surface of member 26 to hold ribs 60 in tight engagement with the outer surface of member 26 and to also partially flatten the ribs as shown, since the distance between the lower wall of the button head 68 and the peak of ribs 60 is less than the thickness of member 26. It will also be remembered that the spacing of the apertures 34 is greater than the spacing of the buttons 66 so that the sealing strip is strethced between each of the apertures to ensure that ribs 60 tightly engage the outer surface of member 26 intermediate apertures 34. When door 12 is in closed position, as shown in FIGURE 2, lip 46 engages a sealing surface 80 of the body 10 to deflect the sealing lip as shown, as the lip flexes relative to base section 44 about the arcuate juncture portions 52.

The heavy base layer 58 of layer 56 acts to rigidify the base section 44 of body 42 so that the sealing lip 46 will flex independently of the base section and will also not cause the base section to roll with respect to the outer surface of member 26 when the door is closed. The base layer 58 further rigidifies passages 72 and 74 and provides a firm anchor for buttons 66 on the base section 44 to prevent separation between the base section and the buttons when the sealing strip is mounted on the door and also when the sealing lip 46 flexes relative to the base section. The base section 44 is also rigidified by the rib 62 which projects oppositely to the sealing lip to further prevent rolling of the base section relative to member 26 when the sealing lip is flexed. As shown in FIGURE 2, when the weatherstrip is mounted on the door, the rib 62 engages flange 32 and is partially flattened thereby whereby the flange backs up the rib and aids the rib in preventing rolling of the base section with respect to member 26 when the sealing lip 42 is deflected from its normal position as shown therein in dotted lines to its sealing position.

It is well known in the sealing strip art to provide attaching buttons similar to the buttons 66 which are stretched by insertion of a tool within the buttons in order that the buttons may be inserted through an aperture of smaller size so as to mount the sealing strip on a supporting member. However, in all such prior art strips, the passage opening to the interior of the buttons is straight and opens to the upper wall of the strip through the arcuate juncture portion 52 which joins the sealing lip 46 to the base section 44. By locating the passages 72 and 74 generally normal to each other so that passage 74 opens to the side of the sealing strip, certain very definite and unique advantages are obtained. One distinct advantage is the minimization of water accumulation within the passage which opens to the interior of the buttons. This water accumulation may have a deleterious effect on certain sealing strip materials, and additionally can cause tearing of the body of the strip when the passage is compressed upon deflection of the sealing strip. Additionally, the passage 74 is much stronger than a passage opening to the upper wall of the sealing strip since it is partially surrounded by the heavy base layer 58 so as to prevent possible tearing of the wall of the passage upon insertion of the tool. Another distinct advantage is in the uniform compression throughout the sealing strip since there is no interruption whatsoever in the upper wall of the base section adjacent the sealing lip.

Although the side access passage has been shown and described in conjunction with a sealing strip formed of particular materials, it will be understood that it can be used with equal success with sealing strips formed of other elastomeric materials.

A sealing strip formed of the particular materials hereinbefore described has several distinct advantages over presently known sealing strips which include a foam rubber body provided with an outer covering of latex or other similar elastomeric material. One distinct advantage is the lack of any squeak caused by rubbing of the sealing strip against the sealing surface when the door is being closed, or while the door is closed and the automobile is in motion. This squeak is a particularly troublesome problem with presently known sealing strip materials and can become very objectionable. Another distinct advantage is in the smooth appearance of the outer surface of the sealing strip. This smooth appearance adds greatly to improve the appearance of the automobile.

For a description of a process for manufacturing a sealing strip such as described herein, reference may be had to the copending application Serial No. 17,518 Alley et al., filed March 25, 1960, assigned to the assignee of this invention.

In the specification and in the following claims, the term "polyvinyl resin foam" means a foam or cellular product produced by heating a polyvinyl plastisol containing a blowing agent to a temperature in the neighborhood of the fusion temperature of the resin and above the temperature at which the blowing agent generates a gas whereby the plastisol is expanded and converted into a cellular or foamed plastic material. An example of a suitable polyvinyl plastisol for use in the present invention consists of about 100 parts of plastisol-grade polyvinyl chloride, 80 to 105 parts of a suitable plasticizer such as tricresyl phosphate, di-2-ethylhexyl phthalate, dioctyl phthalate, dioctyl adipate, dioctyl sebecate and mixtures of these and other suitable plasticizers. Preferably the plastisol contains 3 to 5 parts of a stabilizer such as dibasic lead phosphite. The blowing agent preferably consists of N,N'-dinitroso-N,N'-dimethyl terephthalamide present in a range of 1 to 8 parts.

By the term "polyvinyl resin" is meant vinyl resins such as polyvinyl chloride, vinyl chloride-acetate copolymers, and vinyl chloride-diethyl maleate copolymers.

Thus, this invention provides a new and improved sealing strip for sealing closures.

We claim:

1. A flexible sealing strip, comprising, a resilient elongate body of plastic resin foam material, said body including a base section and an integral sealing lip projecting angularly from the upper wall of said base section, and having an outer coextensive layer of substantially non-porous plastic resin material formed integrally therewith so as to encase said body therewithin, a plurality of hollow mounting buttons of substantially non-porous plastic resin material projecting from the lower wall of said base section, said base section including a lateral passage located below said sealing lip and opening to one side wall of said base section and to the interior of said buttons to permit the insertion of a tool into the interior of said buttons.

2. A flexible sealing strip comprising, a resilient elongate body of polyvinyl resin foam material having a base section, an integral flexible sealing lip projecting angularly from the upper wall of said base section adjacent one of the side walls thereof, said lip merging on arcuate junctures with said one of said side walls and with said upper wall, said body having an outer thin coextensive layer of substantially non-porous polyvinyl resin formed integrally with said base section and coextensive with said sealing lip, with said one of said side walls, with said upper wall, and with the other of the side walls of said body, an elongate rib of substantially non-porous polyvinyl resin projecting from said base section oppositely to said sealing lip to rigidify said base section and ensure flexing of said sealing lip independently of said base section, an outer substantially thick layer of non-porous polyvinyl resin coextensive with the lower wall of said base section, and mounting means secured to said base section, said mounting means including a plurality of hollow mounting buttons of substantially non-porous polyvinyl resin projecting from the lower wall of said base section and having the interiors thereof communicating with respective lateral passages located within said base section below said sealing lip and opening to said one side wall thereof.

3. In combination with a support member, a flexible sealing strip, comprising, a resilient elongate body of polyvinyl resin foam material, said body including a base section and an integral sealing lip projecting angularly therefrom and having an outer coextensive layer of substantially non-porous polyvinyl resin formed integrally therewith so as to encase said body therewithin, spaced mounting means on the lower wall of said base section for mounting said strip on said support member, and an elongate rigidifying rib of substantially non-porous polyvinyl resin projecting angularly from said base section and oppositely to said sealing lip to rigidify said base section against rolling relative to said support member and to ensure flexing of said sealing lip independently of said base section upon engagement of said sealing lip with a sealing surface, said rigidifying rib having a thickness many times greater than that of said outer coextensive layer and being formed integral with said outer coextensive layer.

4. A flexible sealing strip comprising, an elongate body of resilient material, said body including a base section and a sealing lip formed integral with said base section and extending angularly therefrom, a plurality of hollow headed mounting buttons projecting from the lower wall of said base section and being formed integral with said base section and sealing lip, said base section including a passage enclosed therewithin and opening at one end thereof to one side of said base section below said sealing lip, said passage opening at the other end thereof to the interior of said hollow mounting buttons and cooperating therewith to provide a continuous generally L-shaped guide passage guiding insertion of a tool into the interior of each of said mounting buttons to permit stretching of said buttons generally longitudinally thereof and receipt of said buttons within openings provided in a support panel.

References Cited in the file of this patent
UNITED STATES PATENTS

| | | |
|---|---|---|
| 1,694,291 | Sywert | Dec. 4, 1928 |
| 2,638,642 | Spraragen | May 19, 1953 |
| 2,781,561 | Gifford et al. | Feb. 19, 1957 |
| 2,884,668 | Harris et al. | May 5, 1959 |
| 2,972,789 | Mathues | Feb. 28, 1961 |
| 3,011,218 | Mitten | Dec. 5, 1961 |
| 3,112,536 | Gagnier | Dec. 3, 1963 |